April 9, 1963 W. E. DU VALL 3,084,863

ANALOGUE COMPUTER

Filed Feb. 19, 1962 2 Sheets-Sheet 1

WILBUR E. DU VALL
INVENTOR.

BY Lyon & Lyon

ATTORNEYS

April 9, 1963 W. E. DU VALL 3,084,863

ANALOGUE COMPUTER

Filed Feb. 19, 1962 2 Sheets-Sheet 2

WILBUR E. DU VALL
INVENTOR.

BY Lyon & Lyon

ATTORNEYS

United States Patent Office 3,084,863

Patented Apr. 9, 1963

3,084,863

ANALOGUE COMPUTER

Wilbur E. Du Vall, Gardena, Calif., assignor to The W. W. Henry Company, Huntington Park, Calif., a corporation of California Filed Feb. 19, 1962, Ser. No. 173,980
8 Claims. (Cl. 235—194)

This invention relates to analogue computers and, more particularly, to a computer for converting voltage and current information into desired power readings.

The present practice which is employed at various power stations for determining the watts, or vars, or power factor, of the power being supplied to various transmission lines is to have meters which read the voltage and current connected to these lines. A man is designated to read these meters periodically and then send the information to a computing center, where the computations which give the required power readings is made. This is no problem where only a few distribution lines are employed. However, with the complexity of modern-day living, a single power station at a dam, for example, can supply power on as many as 100 different transmission lines. Therefore, it becomes important to provide equipment for continuously monitoring the power on these various lines and for providing information instantaneously as to this power. This instantaneous information is required for permitting corrective action to be taken, when required.

Accordingly, an object of this invention is to provide apparatus for simplifying the conversion of voltage and current information into power information.

Another object of this invention is the provision of a novel and unique circuit ararngement for converting voltage and current information into power information.

Yet another object of the present invention is to provide an analogue computer which, in response to a voltage in current input, can provide output information in the form of watts, vars, or power factor.

These and other objects of this invention are achieved by a circuit arrangement having as its input the voltage and current information from which the power information is desired to be computed. The voltage information is applied to a gate. The current information is squared and then employed to open this gate, either at the leading or trailing edge of the squared wave, determined by whether or not one wishes the cosine or sine of the angle to take a part in the final information. The output of the gate, which consists of a constant, times the maximum voltage, times the cosine of the angle between it and the current, is employed to charge up a capacitor. This capacitor is then discharged at a constant rate. The output of the capacitor while being discharged is applied to another gate. The current wave is rectified and filtered and applied to the gate. The output of the gate consists of substantially rectangular pulses, whose width is determined in accordance with the time interval required for discharging the capacitor, and whose amplitude is determined by the amplitude of the current applied to the gate. The average value of the waveform output which is derived by applying the output of a gate to a filter, consists of the product of the current times the voltage, times cosine $\theta$, or the power which is represented by the input. By opening the gate to which the voltage is applied in response to the leading edge of the square wave derived from the current wave, then the angle between the voltage and current at the output is the sine of $\theta$, and therefore the output will represent vars. By applying a unity voltage and a unity current at the input, the output quantity can either be made to represent the cosine $\theta$ or the angle between them, or the sine $\theta$. The cosine of $\theta$ is the power-factor angle.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
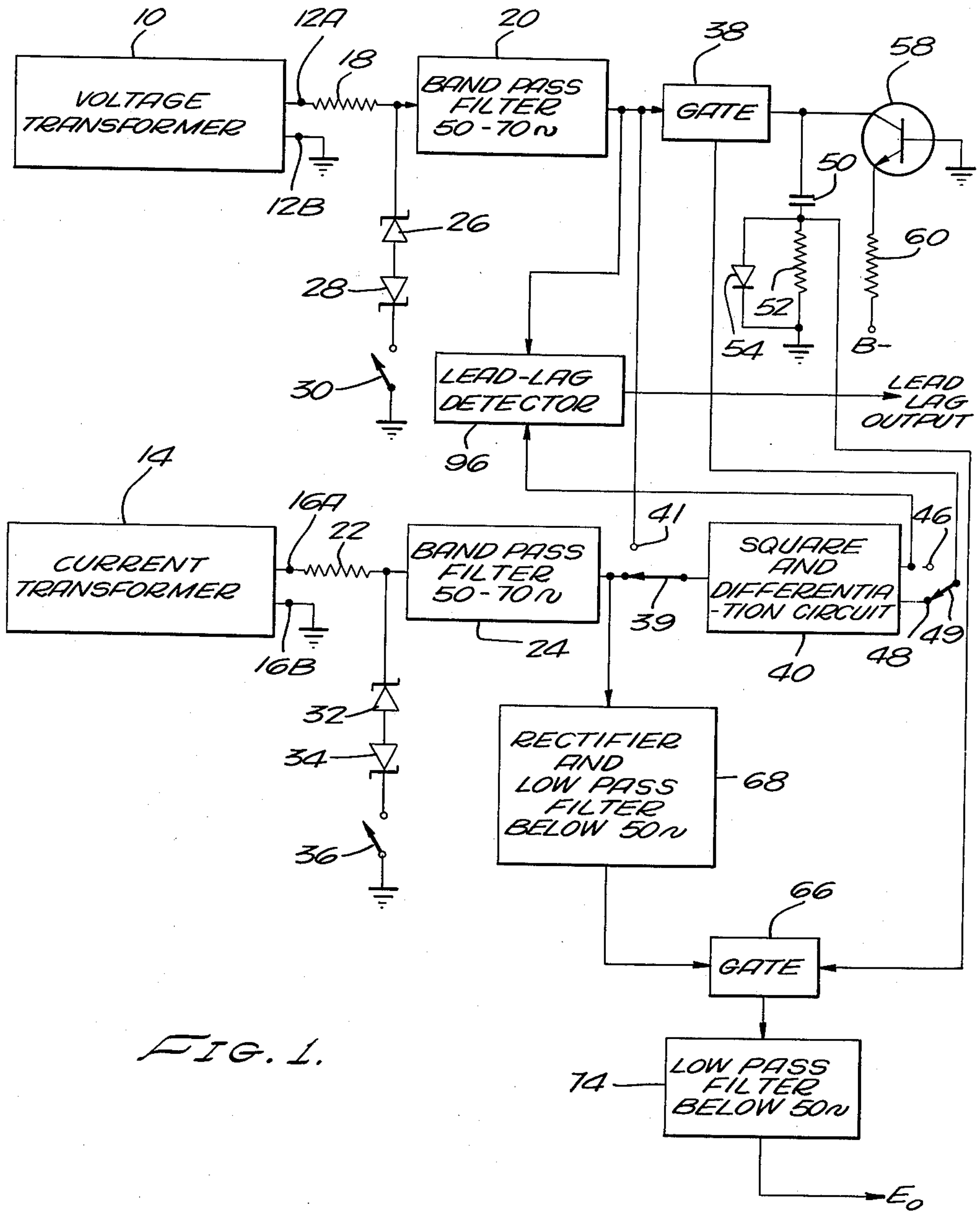
FIGURE 1 is a block diagram of an embodiment of the invention.

At a power station, usually the high-voltage lines have a voltage transformer connected across the lines in order to derive voltage at, say, 110-volt value from the 60,000-volt line, and current having some reasonable value from these lines. In accordance with this invention, the output of a voltage transformer 10, which is coupled to the high-voltage lines, is connected to input terminals 12A, 12B, which are also the voltage-input terminals of the embodiment of the invention. The output of the current transformer 14, which is coupled to the high-voltage transmission lines, is applied to current-input terminals 16A, 16B, of this device. The voltage-transformer output is applied through a voltage-dropping resistor 18 to a bandpass filter 20. The current-transformer output is applied through a current limiting resistor 22 to a bandpass filter 24. The bandpass filters 20 and 24 are substantially identical and are designated to pass the frequency of operation of the power-line system. Thus, where the power-line system operates at 60 cycles, the bandpass filter would pass 50 through 70 cycles. Across the input to the bandpass filter 20, there are connected two Zener diodes, respectively 26, 28, back-to-back and through a switch 30 to ground. Across the input to the bandpass filter 24, there is likewise connected a pair of Zener diodes, respectively 32, 34, back-to-back, in series with a switch 36, which is connected to ground. The function of the Zener diodes 26, 28 and the switch 30, when closed, is to apply a standard voltage to the input to the bandpass filter 20. Similarly, the function of the Zener diodes 32, 34, when switch 36 is closed, is to apply a standard current input to the bandpass filter 24. The values of the current and voltage are effectively unity. Therefore, if the voltage and current are unity, as will be shown subsequently herein, the output of the computer will comprise either the sine $\theta$ or the cosine $\theta$, where $\theta$ is the angle between the current and voltage. For operating the system where other information than the sine or cosine of the angle between the voltage and current is desired, the switches 30 and 36 are left open. The Zener diode circuit effectively operates as a clamp and bypasses any voltage which exceeds the Zener breakdown voltage, whereby unity input is assured at all times.

If the inputs to the voltage terminals 12A, 12B is $e_1 = E_m \sin \omega t$ (Equation 1), then the output of the bandpass filter 20 can be represented by $e_2 = k_1 E_m \sin \omega t$ (Equation 2), where $e_2$ is the difference in voltage occasioned by the circuitry through which the voltage $e_1$ has passed. The voltage $e_2$ was applied to a gate 38.

If the input to the current terminals 16A, 16B may be represented as $e_3 = k_2 I_m \sin (\omega t + \theta)$ (Equation 3), then the output of the bandpass filter will effectively be substantially the same value as the input. The output of the bandpass filter 24 is applied to an input terminal of a squaring and differentiating circuit. The output of the squaring and differentiating circuit is separated so that a signal is derived, either at the leading edge of the square wave which occurs at an interval determined by sine $\theta$, and another signal is derived at the trailing edge of the square wave which occurs at an interval determined by cosine $\theta$. These respective outputs are applied to terminals 46 and 48. Terminal 46 provides the output signals coresponding to the leading edge of the square wave, and terminal 48 provides output signals corresponding to the trailing edge of the square wave. Referring back to FIGURE 2, the signals which are seen at terminal 46 are represented by the pulses 46A, and the signals which are seen at terminal 48 are represented by the pulses 48A. The gate 38 is opened in response to whichever one of the terminals 46 and 48 is selected.

Figure 2:
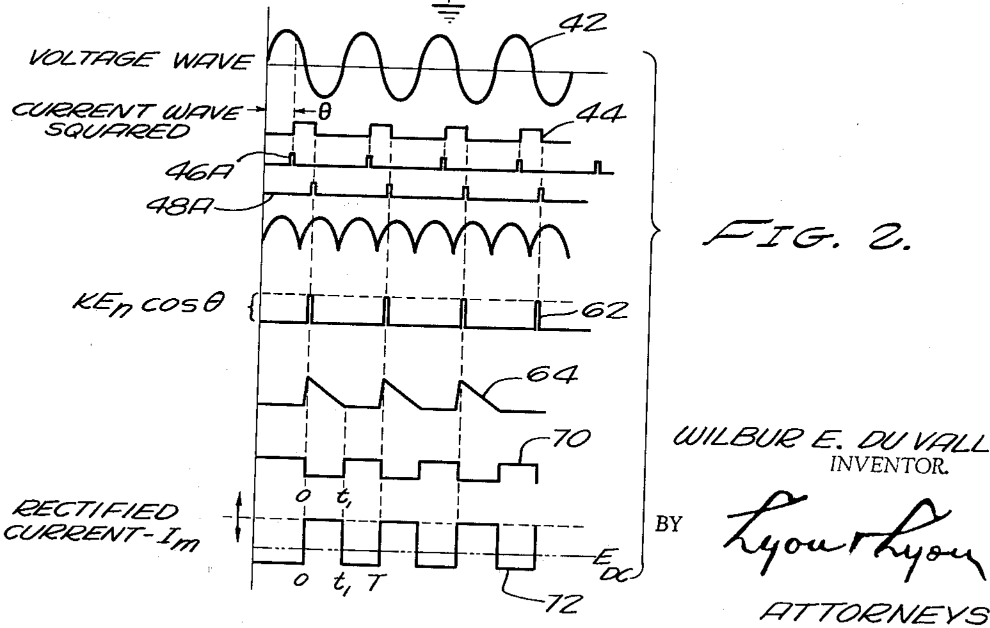
FIGURE 2 is a wave shape, shown to assist in an understanding of the invention.

As may be seen from FIGURE 2, by enabling gate 38 to be opened in response to the leading edge of the pulses 44, a slice of the voltage sine wave is derived and applied from the output of the gate to charge up a capacitor 50. This capacitor is in series with a resistance 52, which is connected to ground and has connected thereacross a diode 54. The diode 54 is provided in order to enable the capacitor 50 to be charged extremely rapidly since the diode 54 is connected in its conductive direction, and thus the capacitor effectively is connected directly to ground for charging up. When the gate 38 is closed, however, the discharge path of capacitor 50 includes resistor 52 and the collector base path of a transistor 58. The emitter of transistor 58 is connected through a resistor 60 to a bias source, in order to insure that the discharge path always has the same time constant. Accordingly, regardless of to which voltage the capacitor 50 is charged, the time constant of the discharge is identical.

Referring back to FIGURE 2, the slice taken out of the sine wave 42 by the trailing edge of the squared current wave is represented by the wave shape 62. The amplitude of this wave shape, as previously indicated, represents a constant $KE_m \cos \theta$. This voltage is applied to charge up the capacitor 50. The discharge of the capacitor 50 then occurs at a constant rate. The time required for the capacitor to discharge is a function of the voltage to which it is charged. Therefore, the amplitude of the charging voltage has been converted to a pulse width representative thereof. The discharge curve of the capacitor 50 is represented by the wave shape 64, shown in FIGURE 2.

An output representative of the discharge of the capacitor 50 is derived from across the resistor 52 and is applied to a gate 66. This gate remains closed until it receives another input, which comprises the rectified and filtered output of the filter 24. The output of the filter 24 is applied to rectifier and filter 68. Also included in this low-pass filter 68 is a rectifier, so that the output of the rectifier low-pass filter 68 comprises a voltage $e_0=k_4I_m$ (Equation 4). Here, $k_4$, is another constant.

Accordingly, the input to the gate 66 comprises a D.C. voltage $e_0$ and a gating, or rectangular, voltage which is derived from the resistor 52. This voltage wave shape is represented by the wave shape 70, shown in FIGURE 2.

The output of the gate 66 will therefore constitute a wave shape such as represented in FIGURE 2 by the wave shape 72. This wave shape comprises rectangular pulses whose amplitude is a function of $I_m$ and whose width is determined by the width of the pulses derived from the resistor 52 which, of course, are determined by the amplitude of the charge applied to the capacitor 50. The output of gate 66 represents a product quantity of the current and voltage terms. This quantity is applied to another low-pass filter 74. The output of the low-pass filter equals $E_{out}=(k_4I_m)(k_3E_m \cos \theta)k_5$ (Equation 5), which by collecting terms, is equal to $KI_mE_m \cos \theta$ (Equation 6). It is thus seen that the output of the analogue circuit, in response to its input, is equal to a quantity which represents the watts of the input.

Referring back to FIGURE 1, if the swicth 49 is actuated to select the output of terminal 46 instead of the output of terminal 48, then as previously described the waveform 46A is employed for opening gate 38. This is the sine function quantity. The system operates exactly as described for the cosine function, except that this time the output of the low-pass filter 74 equals an output $E_{out}=(k_4I_m)(k_3E_m \sin \theta)k_5$ (Equation 7), or, by consolidating terms, $=KI_mE_m \sin \theta$ (Equation 8), or vars.

It may now be seen that by closing the switches 30 and 36, where the input voltage and current quantities are representative of unity, then the output quantity will represent the cosine of $\theta$ where switch 49 is actuated to be connected to terminal 48, or the sine of $\theta$ where switch 49 is actuated to be connected to terminal 46.

It will be seen that the input to the squaring and differentiating circuit 40 is connected to a selector switch 39. Selector switch 39 can either connect to the output of the bandpass filter 24 or to a terminal 41. The terminal 41 is connected to the output of the bandpass filter 20. Accordingly, the output of the squaring portion of the square wave and differentiating circuit will be a square wave derived from the voltage sine wave. The differentiating circuit then separates the leading and trailing edges of this square wave. When this is done, then the gate 38 will comprise an output voltage which is the maximum value of the sine wave, since gating occurs only when the sine wave attains its maximum voltage value. By doing this, we make the cosine of the angle between the current and voltage unity, and therefore the output which is derived from the low-pass filter 74 will constitute a signal representing purely the product of the voltage and current.

Figure 3:
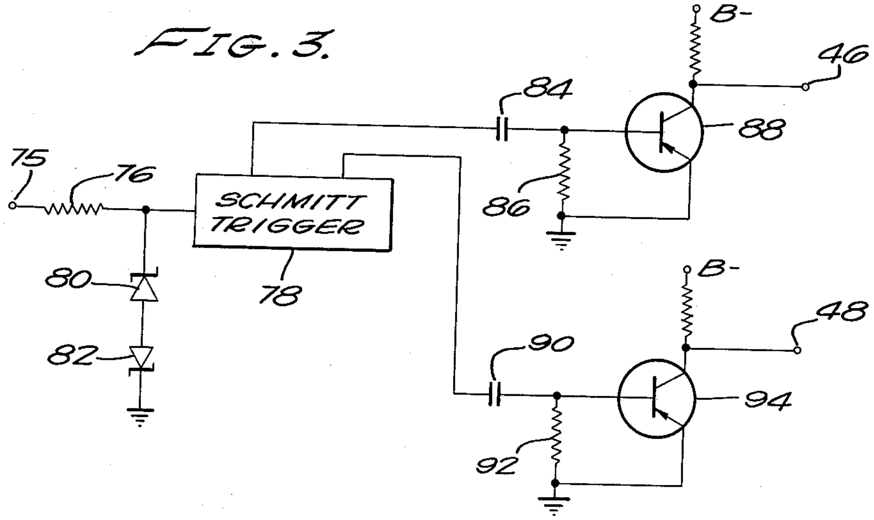
FIGURE 3 shows the details of the squaring and differentiating circuit.

Reference is now made to FIGURE 3, which shows the details of the squaring and differentiating circuits 40, whereby the leading edge or trailing edge of the square wave may be obtained. The output of the filter 24 is applied to an input terminal 75. This input terminal is connected through a resistor 76 to the input to a Schmitt trigger circuit 78. Across the input to the Schmitt trigger circuit there are connected two Zener diodes in series and back-to-back. These Zener diodes, respectively 80, 82, clamp or bypass any voltage which exceeds the Zener value of these Zener diodes. Accordingly, the Schmitt trigger is actuated by a square wave applied to its input. The output of the Schmitt trigger circuit is taken from both of the stages which are included therein. Therefore, the output wave shapes provide voltages of both polarities. By differentiating both of these outputs and applying them to a succeeding amplification stage of a transistor, the output of the transistor will occur either at the leading edge of the input wave or at the trailing edge of the input wave, as determined by the connection back to the Schmitt trigger. The differentiating circuit, for one side of the Schmitt trigger or for one output of the Schmitt trigger, includes a series-connected capacitor 84 and a shunt-connected resistor 86. The junction of the differentiating circuit 84, 86 is connected to the base of a transistor 88. Output to terminal 46 is derived from the collector of this transistor. The other output from the Schmitt trigger 78 is applied to a differentiating circuit including a series-connected capacitor 90 and a shunt-connected resistor 92. The junction of the differentiating circuits 90, 92 is connected to the base of a transistor 94. Output from the collector of the transistor is connected to the terminal 48.

Reference is now made back again to FIGURE 1. In addition to the information as previously indicated which may be derived from the circuit, it is also capable of providing information as to whether or not the voltage-current relationship is a leading one or a lagging one. In other words, it determines whether the sine of the angle is positive or negative. This function is performed by a lead-lag detecting circuit 96. One input to the lead-lag detecting circuit consists of a sine wave which is the output of the bandpass filter 20. The other input to the lead-lag circuit consists of the leading-edge-representative signals of the output of the square-wave and differentiating circuit 40. These signals, as shown by the wave shape 46A of FIGURE 2, are applied as the second input to the lead-lag detecting circuit. The output of the lead-lag detecting circuit will be a signal which indicates either that the sine of the angle is positive or the sine of the angle is negative.

Figure 4:
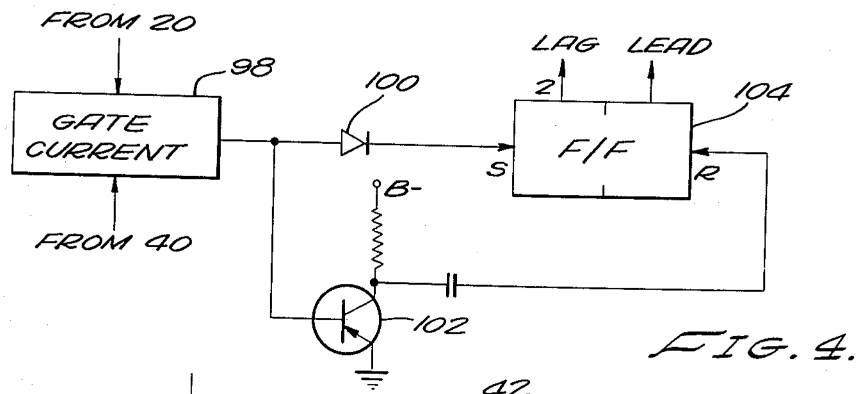
FIGURE 4 is a block diagram of the details of the leading and lagging detecting circuit.

Reference is now made to FIGURE 4, which is a block diagram of the details of the lead-lag detecting circuit 96. This includes a gate circuit 98, which has the sine-wave signal applied to one input and the pulse signal applied to the other input. The output of the gate circuit is a slice of the sine-wave signal which occurs near the point at which the sine wave crosses the zero axis. If the angle $\theta$ is a leading angle, then the output of the gate circuit will be a positive slice of this sine wave; if the angle $\theta$ is a lagging circuit, then the slice of the sine wave will be negative. A diode 100 is connected to the output of the gate circuit, as well as a transistor 102. The diode is poled so that it will only pass positive output signals from the gate circuit. These positive output signals are applied to a flip-flop circuit 104 to drive the flip-flop to its set state. Accordingly, when the flip-flop 104 is in its set state, its output indicates that a lagging relationship exists between the voltage and current or that the sine $\theta$ is negative. The output of the gate circuit 98 is applied to the base of the transistor 102. This transistor will only pass negative signals which are applied to its base. Accordingly, the negative output of the gate circuit is applied through the transistor 102 to the reset terminal of the flip-flop 104. Accordingly, when flip-flop 104 has its reset output actuated, this is indicative of the fact that there is a leading relationship existing between the voltage and current, or that the sine $\theta$ is positive.

From the foregoing description, it will be seen that a novel, unique, and simple analogue computer is provided which may be used for providing the following information: first, the watts, which may be derived from a voltage and current; second, the vars; third, the cosine of the angle existing between voltage and current; fourth, the sine of the angle existing between voltage and current; fifth, the product of the voltage and current; and, sixth, whether or not the angle is a leading or a lagging angle.

I claim:

1. An analogue computer having a first input terminal, means for applying a voltage to said first input terminal, a second input terminal, means for applying a current to said second input terminal, means for converting said current into a square wave, means for deriving leading-edge signals and lagging-edge signals from said square wave, a gate circuit having two inputs and a single output, means for applying said voltage to one of said gate inputs, means for selecting one of said leading- and lagging-edge signals and applying the selected signals to the other input of said gate, capacitor means having a charging and discharging circuit, means for applying the output of said gate to said capacitor means for charging said capacitor means, a second gate having two inputs, means for rectifying said current applied to said second input terminal and for applying it to one of the said second gate inputs, means for applying the output of said capacitor means discharging circuit to the second input of said second gate, whereby the output of said second gate represents watts or vars.

2. An analogue computing circuit comprising first and second input terminals, means for applying an alternating-current voltage to said first input terminals, means for applying an alternating-current current to said second input terminals, means connected to said second input terminals for deriving from said current a first gating signal whose occurrence relative to said voltage represents the sine of the angle between said current and voltage and a second gating signal whose occurrence relative to said voltage represents the cosine of the angle between the voltage and current, means for selecting a predetermined one of said first and second gating signals, means to which said voltage and said selected one of said first and second gating signals is applied to generate therefrom a third gating signal having a width representative of the product of the maximum voltage in said voltage and the sine or cosine of the angle between said voltage or current as determined by the one of the two gating signals which has been selected, means for rectifying said current applied to said second input terminal, and means to which said rectified current and said third gating signals are applied for producing an output representing the product of its two inputs.

3. An analogue computing circuit as recited in claim 2 wherein there is connected across said first input terminals means for standardizing the input voltage, there is connected across said second input terminals means for standardizing the input current whereby the output of said means to which said rectified current and said third gating signal are applied comprises a signal representative of the sine or cosine of the angle between said voltage and current depending upon the one of said first and second gating signals which is selected.

4. An analogue computing circuit comprising first and second input terminals, means for applying an alternating-current voltage to said first input terminals, means for applying an alternating-current current to said second input terminals, means coupled to said second input terminals for generating a square wave, means for generating a first gating pulse responsive to said square wave, a first gate having first and second inputs and an output, means for applying said voltage to said first input, means for applying said first gating pulse to said second input, capacitor means connected to said first gate output to be charged up therefrom, means for discharging said capacitor means at a constant rate, means for deriving a second gating pulse from said means for discharging having a pulse width representative of the product of said voltage and a function of the phase angle between said current and voltage, means for rectifying said current applied to said second input terminal, a second gate having a first and second input and an output, means for applying said second gating pulse and said rectified current to said second gate respective first and second inputs to provide an output signal representing power expressed in watts or vars depending upon the function of the phase angle.

5. An analogue computer as recited in claim 4 wherein said means for deriving a first gating pulse responsive to said square wave comprises a Schmitt trigger circuit having a first and second output one of which is actuated when the other is not actuated, means to apply said square wave to said Schmitt trigger circuit to cause actuation of said first output in the presence of said square wave, first and second means respectively connected to said first and second outputs for differentiating said first and second outputs, first and second means respectively connected to said first and second means for amplifying signals having the same polarity whereby the output of said first means for amplifying is a gating signal occurring substantially simultaneously with said square wave leading edge and the output of said second means for amplifying is a gating signal occurring substantially simultaneously with said square wave trailing edge, and means for selecting the outputs of one of said first and second means for amplifying for application to said first gate determined by whether a sine or cosine function of the phase angle is desired.

6. An analogue computer as recited in claim 4 wherein there is included a phase angle lead-lag detecting circuit comprising a gate circuit having a first and second input and an output, means connecting said first input to said first input terminals, means connecting said second input to said means for generating a first gating pulse responsive to said square wave, a flip-flop circuit having a first and second output, a first and second input, and means for respectively energizing said first and second output upon energization of said respective first and second inputs, means for applying an output of one polarity from said gate output to said flip-flop first input, and means for applying an output of polarity opposite to said one polarity from said gate output to said flip-flop second input whereby the one of said flip-flop first and second outputs which is energized indicates whether the phase angle between the voltage and current leads or lags.

7. An analogue computer comprising first and second input terminals, means for applying an alternating-current voltage to said first input terminals, means for applying an alternating-current current to said second input terminals, means for generating a square wave responsive to an input signal applied to its input, first switch means for selecting for connection a predetermined one of said first and second input terminals to said square wave generating means, means to which output from said means for generating a square wave is applied for separately generating a first gating pulse responsive to the leading edge of said square wave and a second gating pulse responsive to the trailing edge of said square wave, a first gate having a first and second input and in output, second switch means for applying a predetermined one of said first and second gating pulses to said first gate first input, means for coupling said first gate second input to said first input terminals, a capacitor means connected to said first gate output to be charged up therefrom, means for discharging said capacitor means at a constant rate, means for deriving a third gating pulse from said means for discharging having a pulse width representative of the amplitude of the charge on said capacitor means, means for rectifying the current applied to said second input terminals and deriving an output, a second gate having a first and second input means for applying said second gating pulse and output from said means for rectifying to said third gate first and second inputs to provide at the output of said second gate a signal representing the product of its inputs.

8. An analogue computing circuit as recited in claim 7 wherein there is connected across said first input terminals means for standardizing the input voltage, there is connected across said second input terminals means for standardizing the input current whereby the output of said second gate to which said rectified current and said third gating signal are applied comprises a signal representative of the sine or cosine of the angle between said voltage and current depending upon the one of said first and second gating signals which is selected.

No references cited.